Sept. 19, 1933.    L. E. LAWRENCE    1,927,346
ELECTROMAGNETIC DEVICE
Filed June 30, 1932    5 Sheets-Sheet 1

INVENTOR
L. E. LAWRENCE
BY H. A. Whitehorn
ATTORNEY

Sept. 19, 1933.  L. E. LAWRENCE  1,927,346
ELECTROMAGNETIC DEVICE
Filed June 30, 1932   5 Sheets-Sheet 3

INVENTOR
L. E. LAWRENCE
BY H. A. Whitehorn
ATTORNEY

Sept. 19, 1933.   L. E. LAWRENCE   1,927,346
ELECTROMAGNETIC DEVICE
Filed June 30, 1932   5 Sheets-Sheet 4

INVENTOR
L. E. LAWRENCE
BY H. Q. Whitehorn
ATTORNEY

Sept. 19, 1933.                L. E. LAWRENCE                1,927,346
                           ELECTROMAGNETIC DEVICE
                            Filed June 30, 1932           5 Sheets-Sheet 5

INVENTOR
L. E. LAWRENCE
BY H. A. Whitehorn
ATTORNEY

Patented Sept. 19, 1933

1,927,346

UNITED STATES PATENT OFFICE 1,927,346

ELECTROMAGNETIC DEVICE

Leland E. Lawrence, La Grange Park, Ill., assignor to Western Electric Company, Incorporated, New York, N. Y., a corporation of New York Application June 30, 1932. Serial No. 620,095

32 Claims. (Cl. 175—340)

This invention relates to electromagnetic devices and more particularly to devices responsive to electric currents or voltages, such as electrical measuring instruments, and is a continuation in part of my copending application, Serial No. 545,659, filed June 20, 1931.

An object of the invention is to provide a sensitive and accurate device responsive to electric currents or voltages.

In accordance with one embodiment of the invention, a device having a movable coil is provided having a source of magnetomotive force within the coil and a magnetic circuit outside of the coil which may serve as a shield against stray magnetic fields from outside sources. The provision of the source of magnetomotive force within the movable coil insures a minimum amount of leakage flux and thus increases the effectiveness of the device.

A complete understanding of the invention may be had by reference to the following description taken in conjunction with the accompanying drawings, in which.

Rig. 15 is a sectional view taken on line 15—15 of Fig. 14.

Referring now more in detail to the drawings, Figs. 1 to 5 illustrate an embodiment of the invention in a direct current measuring device. The device is preferably mounted in a casing 21 having a cover 22 provided with a window 23 through which a calibrated scale 24 and a pointer 25 of the device may be seen. The device is mounted upon a bracket 26 which is secured to the base of the casing 21 and is provided with a laterally extending arm 27 on which a plate 28 carrying the scale is supported.

Figures 1, 2, 3, 4, 5:
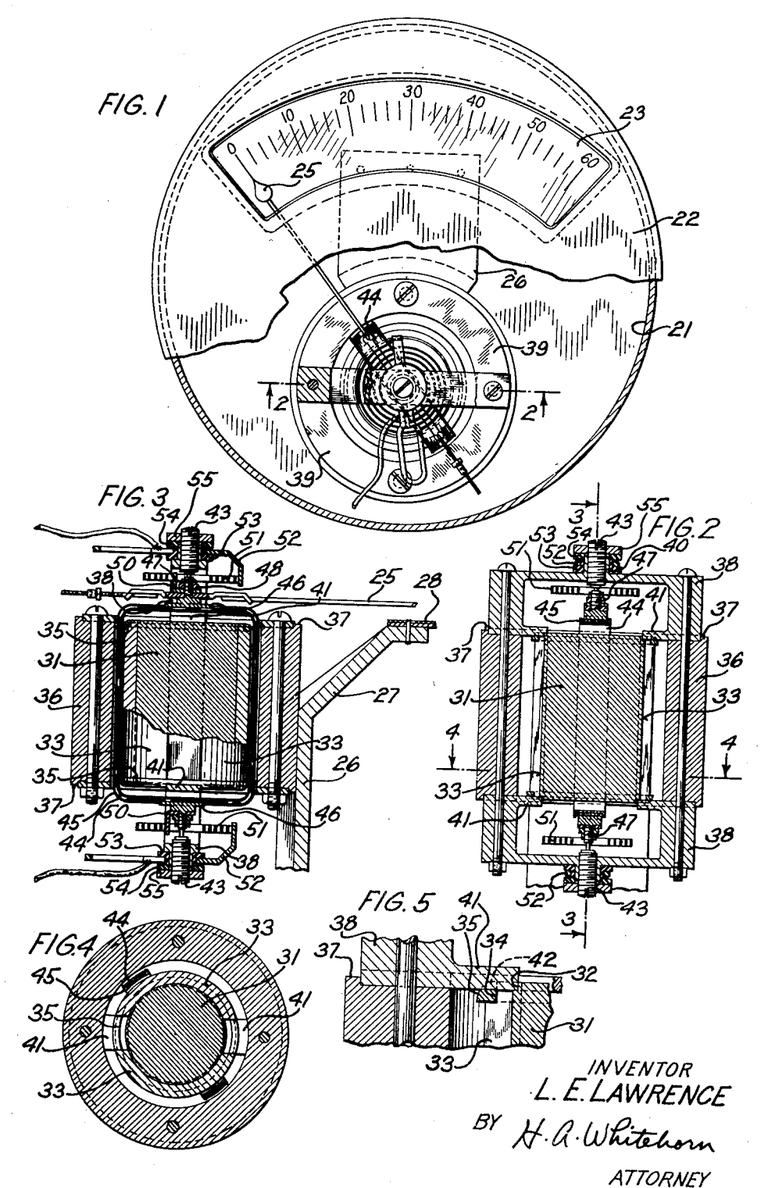
Fig. 1 is a plan view of a device embodying the invention.
Fig. 2 is a sectional view taken on line 2—2 of Fig. 1.
Fig. 3 is a sectional view taken on line 3—3 of Fig. 2.
Fig. 4 is a sectional view taken on line 4—4 of Fig. 2.
Fig. 5 is an enlarged fragmentary sectional view of the yoke, bridge, and the support for central core shown in full in Fig. 2.
Figure 6:
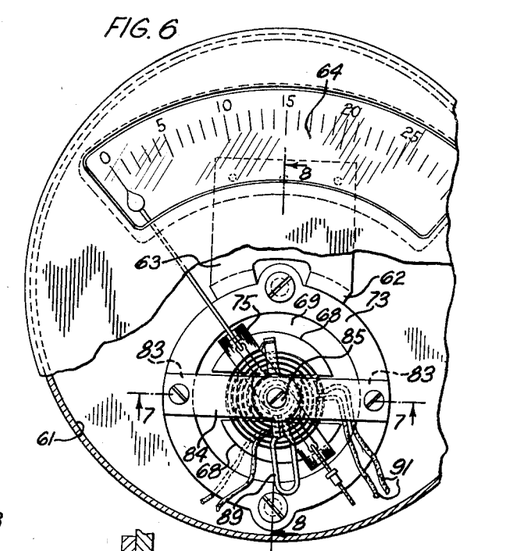
Fig. 6 is a plan view of a modified form of the invention.
Figure 7:
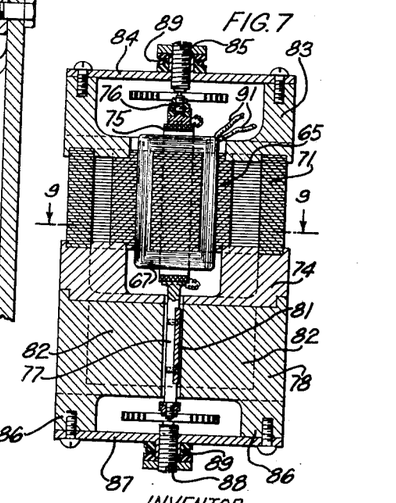
Fig. 7 is a sectional view taken on line 7—7 of Fig. 6.
Figure 8:
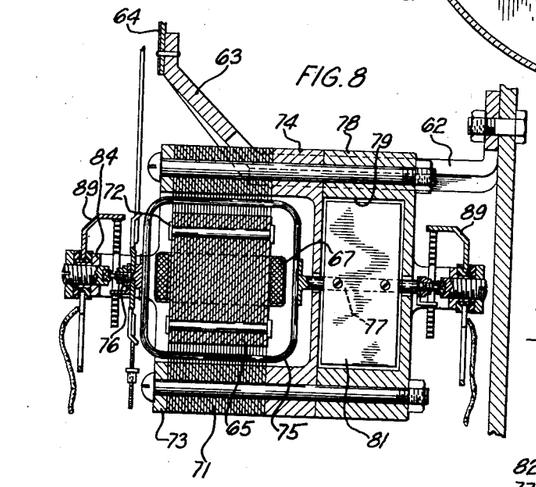
Fig. 8 is a sectional view taken on line 8—8 of Fig. 6.
Figure 9:
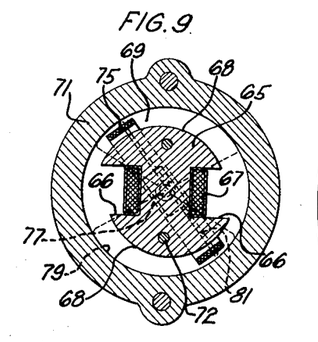
Fig. 9 is a sectional view taken on line 9—9 of Fig. 7.

The device is provided with an internal cylindrical core 31, which is a permanent magnet and is preferably made of cobalt or other steel having a high remanence and high coercive force and acts as a source of magnetic potential for the device. The ends of the cylindrical core are reduced in diameter, forming a ledge 32 extending circumferentially around the cylinder at either end. The magnet 31 has two pole pieces 33 secured thereto which are arcuate, cylindrical sections and each pole piece extends over less than half the circumference of the cylindrical magnet as shown in Fig. 4. These pole pieces are made of magnetic material, such as iron, soft steel, or other suitable material, and serve to distribute the magnetic flux uniformly from the permanent magnet cylinder 31 over a substantial area of the periphery of the cylinder. The pole pieces 33 are provided with a circumferential cut-out portion at their ends providing ledges 34 in which rings 35 of non-magnetic material, such as brass, are adapted to fit, thus holding the pole pieces securely to the cylindrical permanent magnet 31.

Surrounding the permanent magnet and the pole pieces is a cylindrical yoke 36 of magnetic material which completes the magnetic circuit of the permanent magnet in two parallel branches to reduce the reluctance to the magnetic flux from the permanent magnet located centrally of the yoke. The yoke 36 may be made of any suitable magnetic material, such as soft iron or a nickel-iron alloy known as permalloy. The yoke 36 has an axially extending flange 37 at either end and a bridge 38 of non-magnetic material, such as brass, is adapted to fit within each flange, as shown in Fig. 2. It has been found that it is difficult to provide screw apertures with sufficient accuracy to obtain a proper centering of the bridge. By fitting the bridge within the flange 37, the center of the bridge is accurately positioned along one diameter of the cylinder and in order to center the bridge with respect to a normal diameter, a pair of arcuate ring sections 39 are placed within the flanges 37 with their ends abutting against the bridges 38, or the ring sections may be integral with the bridges and placed as units within the flanges. Each of the bridges 38 has a pair of inwardly extending projections 41 which pass through slots 42 in rings 35, between the side faces of pole pieces 33, and into engagement with the ledges 32 of cylinder 31. Thus when the bridges are in position the core and pole pieces will be accurately and positively positioned relative to each other and centered within the cylindrical yoke. Each of the bridges is provided with a threaded aperture for receiving a screw 43 which carries a jewel bearing at its inner end.

Surrounding the pole pieces 33 and movable within the air gap between the pole pieces and the yoke is a movable coil 44 wound upon a substantially rectangular form 45 of aluminum or other suitable material. This form is preferably channel-shaped and has a number of turns of wire wound between the flanges of the channel. A pair of plates 46 is adhesively secured to the coil and the plates have axially extending studs 47 which are threaded for a portion of their length and have reduced ends which act as pivots for engagement with the jewel bearings in the screws 43. The upper stud 47 carries the pointer 25 and each of the studs carries a washer held on the stud by a nut 48 and provided with a projection 50. One end of the movable coil 44 is electrically connected to one of the projections 50 and the other end of the coil is electrically connected to the other projection 50. Spiral springs 51 have their inner ends connected to the projections 50 while their outer ends are connected to levers 52. These levers are mounted upon collars 40 surrounding screws 43 and secured to the bridges 38. The collars 40 are provided with insulating washers 53 having insulating collars surrounding collars 40. The levers 52 fit over the insulating collars and a second washer 54 is placed over each of the levers and engages the collar of washer 53. The washers 53 and 54 are forced into frictional engagement with the levers 52 by locknuts 55; thus the nuts 55 serve a double function of forming locknuts for the screws 43 and frictionally positioning the levers 52. The purpose of the levers 52 is to adjust the pointer 25 to zero position when no current is passing through the device and also to serve as terminals for the coil. The lower lever 52 is preferably used for adjusting the device prior to its assembly in the casing 21, since this lever is not readily accessible when the device is mounted in the casing. The upper lever 52 may be adjusted to accurately set the device on zero to compensate for small deviations occurring after the assembly of the device in the casing. Conductors are secured to the levers 52 and the current passes from one lever 52 through coil spring 51, projection 50, stud 47, through the coil, and out of the other side of the coil in the same manner.

In order to facilitate assembly of the device, the permanent magnet is preferably not magnetized until after assembly of the device because the magnetization of the permanent magnets tends to cause the magnet to be attracted and adhere to other parts, such as the yoke. After the device is assembled, it is placed in a strong magnetic field which will saturate the yoke and apply high magnetic potential across the cylindrical magnet 31. This magnet is magnetized in such a direction that one of its poles will lie on an axial line midway of the arc of one of the pole pieces and the other pole with lie on an axial line midway of the arc of the other pole piece.

It has been found that in a device such as described with the field core surrounding the movable coil, the field core acts as a shield against stray external magnetic fields so that the device is unaffected by such fields.

A current to be measured is led to the movable coil 44 through leads 58 attached to adjusting levers 52, causing the flux produced by the coil to coact with the flux in the air gap produced by the permanent magnet 31. The deflection of the coil will be proportional to the current therein and may be read on the scale by the position of pointer 25 carried by the coil.

Figs. 6 to 9 illustrate an embodiment of the invention in a measuring instrument for alternating electrical currents. The device is mounted in a casing 61 by means of a bracket 62 which is secured to the base of the casing and has a laterally extending arm 63 for supporting a calibrated scale 64. The device is provided with an inner laminated core 65 of soft iron or a nickel-iron alloy known as permalloy which has slots 66 in which a coil adapted to be energized by an alternating current is wound. The outer faces 68 of the core are arranged eccentrically about the center of the core to provide a tapering air gap 69 with a laminated yoke 71 to permit the use of a scale having equal divisions. The laminations of the central core 65 are held together by means of rivets 72. The laminations of the yoke 71 are made of similar material as the core and are clamped between a plate 73 of bakelite or other suitable non-magnetic material and a cup-shaped ring 74 of similar material. A movable coil 75 is rotatably mounted in the air gap 69 and has a stud 76 attached to one side thereof, and a shaft 77 attached to the other side thereof, which extends through an opening in the cup-shaped ring 74. Underneath the cup-shaped ring 74 is a second cup-shaped ring 78 which, together with the base of the cup-shaped ring 74, forms a pocket 79 for a damping vane attached to the shaft 77. The cup-shaped ring 78 has a pair of inwardly extending partitions 82 which separate the pocket 79 into two parts, one for each half of the vane, in accordance with a practice well known in the art, to produce a damping action on the movement of the coil. The ring 73 has two upwardly extending projections 83 which cooperate with the cross-piece 84 to form a bridge for carrying a screw 85 provided with a jewel bearing for one pivot point of coil 75 and the cup-shaped ring 78 is provided with two downwardly extending projections 86, cooperating with a cross-piece 87 to form a support for screw 88, which carries a jewel bearing for the other pivot of the coil attached to the end of shaft 77. Electrical connection is made to the movable coil through adjusting levers 89 in a manner similar to that described in connection with the embodiment of the invention disclosed in Figs. 1 to 5. The stationary coil surrounding core 65 is provided with leads 91 for connection to an electrical circuit. The movable coil 75 and the stationary coil 67 are preferably connected in series to maintain a fixed phase relationship between the currents in these coils. This device is extremely sensitive and due to the fact that the field core surrounds the movable coil, as well as the fixed coil, these coils are shielded against stray fields from external sources.

In Figs. 10 to 13 an embodiment of the invention in a direct current relay is shown. The device is mounted upon a base 101 of bakelite or other suitable insulating material. This base has upwardly extending posts 102 imbedded therein and an outer shell or yoke 103 is provided with suitable apertures for receiving these posts to securely hold the base and yoke together. The base 101 is provided with a pair of projections 104 along the sides thereof for positioning a plurality of bar magnets 105 which form a composite magnet for the device. The bar magnets may be made of cobalt steel or other suitable permanent magnet material having a high remanence and high coercive force.

The bar magnets are held in place on the base by a pair of clamps 106 of insulating material. These clamps are provided with transverse grooves for receiving terminal supports 107 secured to the base and to the clamps by bolts 108. The terminal supports 107 are electrically connected to terminal posts 109 through the bolts 108 and connecting plates 111. Each of the terminal supports 107 has a terminal screw 112, provided with a knurled head, mounted therein for a purpose to be described hereinafter.

Figures 10, 11, 12, 13:
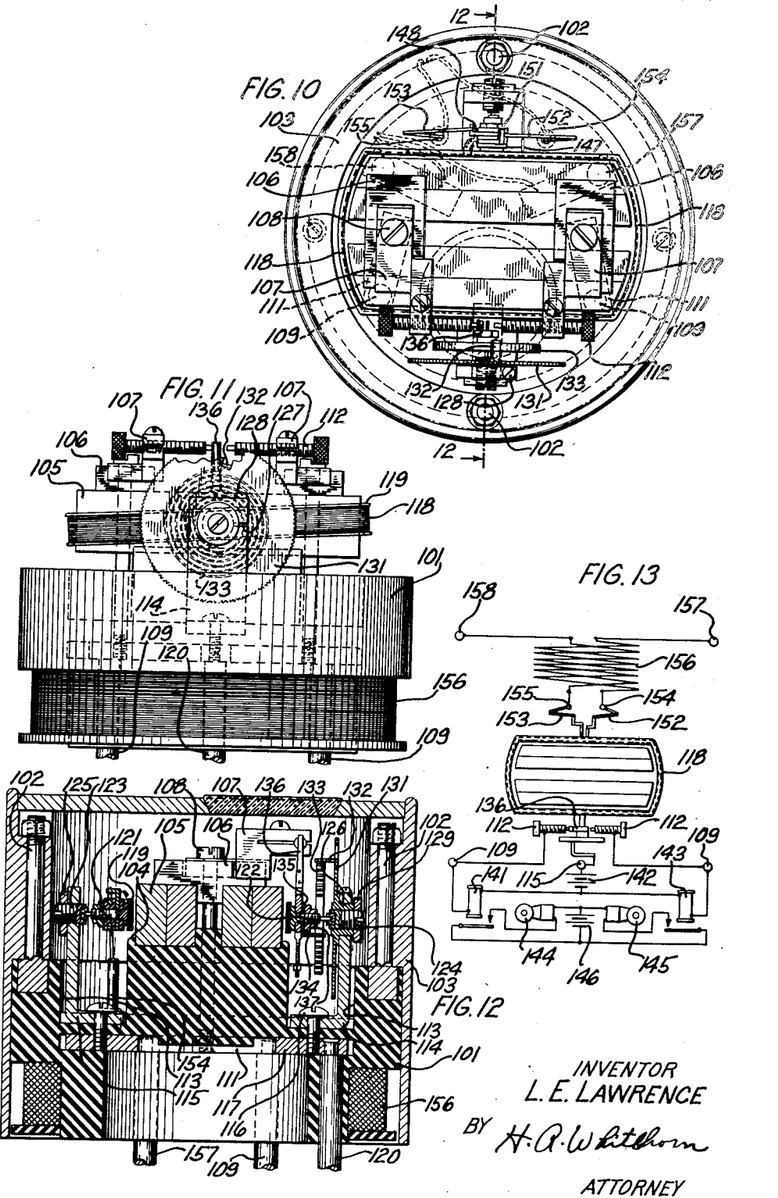
Fig. 10 is a plan view of a modified form of the invention.
Fig. 11 is a side elevation of the device shown in Fig. 10 with the outer shell or yoke removed.
Fig. 12 is a sectional view taken on line 12—12 of Fig. 10.
Fig. 13 is a diagrammatic view showing the circuit arrangement in this embodiment of the invention.

The bar magnets 105 are provided with arcuate ends forming a composite arc about the center of curvature of the field core 103 at a shorter radius than the inner periphery of the field core to provide an air gap for a movable coil 118. This coil consists of a plurality of convolutions of wire wound upon a channel-shaped frame 119 of aluminum or other suitable material. Adhesively secured to the sides of the coil is a pair of studs 121 and 122 which carry pivot points adapted to be journaled in jewel bearings carried by screws 123 and 124. The base 101 is provided with a pair of apertures 113 for receiving standards for bearing supports 114 and 115. The bearing support 114 is electrically connected to a terminal post 120 through a screw 116 and a plate 117, as shown in Fig. 12. The screw 123 is mounted on standard 115 and is secured in position by a locknut 125. The screw 124 is threaded into a collar 126, which is clamped into the standard 114. This standard has a slot 127 which permits the screw 128 to be turned down to cause the standard to firmly grip the collar. The end of the screw is provided with a locknut 129 to prevent rotation of the screw. Integral with the collar 126 is a disc 131 having a laterally extending projection 132 formed therein. This projection is attached to the outer end of a spiral spring 133, the inner end of which is attached to a projection 134 of a washer 135. The washer, together with a pointer or contact arm 136, is secured to the stud 122 of the movable coil by a nut 137. It will be seen, therefore, that the contact arm 136 is electrically connected through projection 134, spiral spring 133, disc 131, and standard 114, to the terminal post 120. Upon the movement of the movable coil, the contact arm may engage either of the terminal screws 112 as the current varies between the predetermined limits in the coil. When the contact arm engages with one of the terminal screws 112, a relay 141 will be energized from a battery 142; and when it engages with the other terminal screw, a relay 142 will be energized thereby selectively ringing bell 144 or bell 145 from a battery 146 to indicate that the current in coil 118 has reached one or the other of the limits of a selected range.

The ends of the coil 118 are connected to washers 147 and 148 which are insulated from each other and held upon the stud 121 by a nut 151. The washers 147 and 148 are provided with suitable projections to which flexible conductors 152 and 153 are attached. The flexible conductors are secured to posts 154 and 155 embedded in the base 101.

The circuit from post 154 leads through a resistance coil to a terminal post 157 and the circuit from post 155 leads through a resistance coil to a terminal post 158. These resistance coils form a composite coil 156 which is non-inductively wound, that is, the conductors from posts 154 and 155 are wound side by side in bifilar arrangement to eliminate the effect of inductance during variations in the current supplied to coil 118.

Relays of this type have many uses, among which may be mentioned the regulation of currents or voltages. When the current in a circuit to which the device is connected reaches one of the points at which a signal is given, steps may be taken to correct the value of the current and return it to the desired value.

Referring now to Figs. 14 to 17 of the drawings, illustrating another embodiment of the invention in a direct current relay, a base 160 is provided of insulating material upon which is mounted frame 161, formed with depressed portions for receiving bar members which form a composite magnet 162, separated by an upwardly projecting supporting member 163 integral with the frame 161. The bar members, which compose the magnet 162, are positioned with like poles adjacent each other and are held against displacement by a suitable clamp 164. A yoke 165 is mounted upon the frame 161 and has cutaway portions 166 and 167 therein to provide a relatively short air gap at the ends and for short distances along the sides from the ends of the composite magnet 162. In this air gap is disposed a movable coil 168 which completely surrounds the magnet 162 and is composed of a shell 169 of any suitable material, such as aluminum, on which is wound a series of convolutions of wire. Pivot bases 175 and 176 fixedly mounted upon the coil 168 but insulated from it contain pivots 177 which have their ends mounted in bearings 178. On one side of the coil 168 are disposed two spiral springs 179 and 180 formed of suitable conducting material and having their outer ends fixed to terminal bars 181 and 182, while the inner end of spring 179 is secured electrically and mechanically to pivot base 175 and the inner end of spring 180 is mounted on the pivot base 175, but insulated from it, and connected electrically to one end of the coil 168, the other end of coil 168 being electrically connected to pivot base 175. Upon the opposite side of the coil 168 is another spiral spring 183 having its inner end fixed to the pivot base 176 and its outer end secured to a terminal bar 184. The bearings 178 are supported in bushings of magnetically permeable material disposed in the yoke 175 adjacent portions thereof which are cutaway to receive the spiral springs 179, 180 and 183, and the pivotal supporting means for the coil 168. A cover or casing 185 provided for the relay has its edges receivable in depressed portions of the base 160 and is secured in place by any suitable means, such as screws 186 having their ends received in threaded apertures in the yoke 165.

Figure 17:
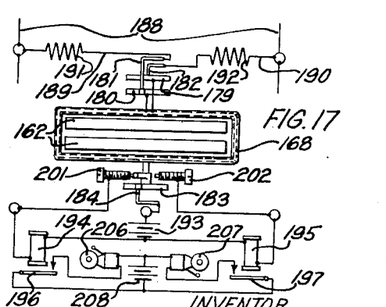
Fig. 17 is a diagrammatic view showing the circuit arrangement of this embodiment.

In Fig. 17 there are shown lead lines 188 of a circuit, across which the relay is electrically connected. Conductors 189 and 190, which electrically connect the terminal bars 181 and 182, respectively, with the lead lines 188, have disposed therein resistance coils 191 and 192, respectively, for effecting the desired reduction in energy applied to the coil 168. Electrically connected to the terminal bar 184 of the spiral spring 183 is a source of current, such as battery 193, for providing electrical energy to switch-actuating relays 194 and 195, the relays 194 and 195 being arranged to close switches 196 and 197, respectively, when one or the other of two circuits are closed, due to movement of the coil 168. The closing of the circuits to the relays 194 and 195 is brought about by movement of a pointer or contact switch 200, which is fixed to the pivot base 176 and electrically connected to the spiral spring 183. The upper end of the pointer or contact switch 200 may be provided with an indicating dial, but in the present instance there is shown adjustable contact members 201 and 202 supported by the upwardly extending projection 163 of the frame 161 and arranged to be spaced relative to the pointer 200. Electrically connected to the adjustable contact members 201 and 202 are conductors 203 and 204, which include the switch actuating relays 194 and 195 and form circuits including the battery 193. The switch 196, when closed due to the energization of the relay 194, closes a circuit including a signaling means, such as a bell 206; and the switch 197, when closed due to the energization of the relay 195, closes a circuit which includes an audible signal, such as a bell 207, a battery 208, or any other suitable source of current supplying the electrical energy for these circuits.

Figure 14:
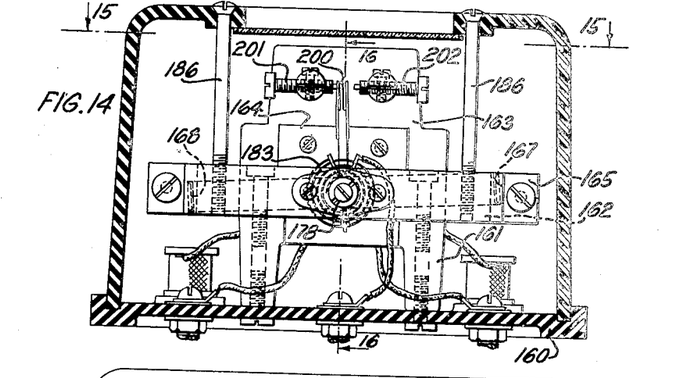
Fig. 14 is a vertical section of another embodiment of the invention.
Figure 15:
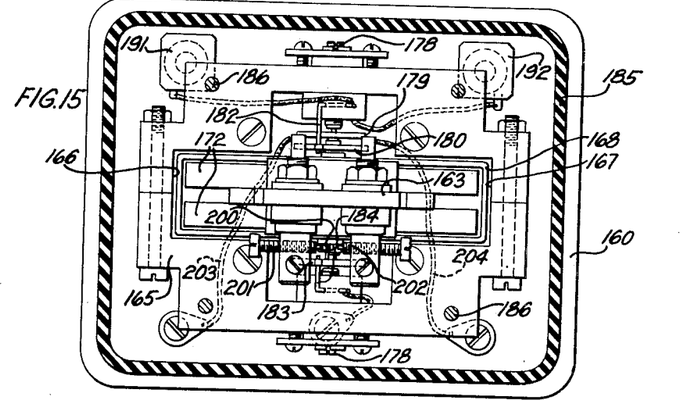
Fig. 15 is a sectional view taken on line 15—15 on line 16—16 of Fig. 14.
Figure 16:
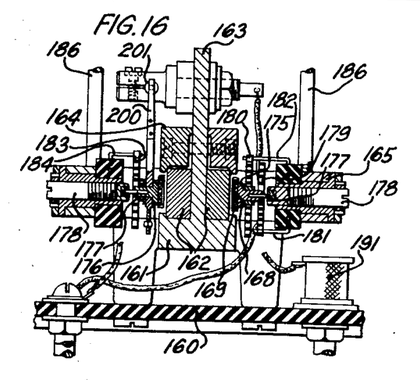

During the operation of the relay, the coil 168 is normally urged in a counterclockwise direction, viewing Fig. 14, by the spiral springs 179, 180 and 183, so as to move the contact switch 200 to the left and into contact with the contact point 201 when the voltage across the line 188 is low. However, during the normal flow of energy, the magnetizing force set up around the ends of the coil 168 opposes the force of the spiral springs or, in other words, moves the coil 168 a sufficient distance about its pivots against the tension of the spiral springs to centrally position the contact switch 200 between the contact points 201 and 202 and out of electrical engagement therewith. If the flow of energy is high, the coil 168 will be rotated further in a clockwise direction and in doing so the contact switch 200 will be moved into electrical engagement with the contact point 202, thus closing the circuit including the relay 195 which, when energized, will close the switch 197 in the circuit including the audible signal 207, indicating that there exists a high voltage in the main line 188. The audible signal 207 will continue to be energized until the voltage is lowered in any suitable manner. When the voltage in the main line 188 has been lowered, the force of the magnetic flux around the coil 168 will be decreased and the force of the spiral springs 179, 180 and 183 will rotate the coil in a counterclockwise direction (Fig. 14). Various adjustments may be made to cause the proper voltage to be supplied in the main line 188, such as varying the field of the generator supplying electrical energy to the main line. The contact switch 200 will remain in a substantially vertical position as long as there is a desired voltage in the main line 188, but if this voltage would drop an appreciable amount, the force of the spiral springs will overcome the magnetic force tending to move the coil 168 in a counterclockwise direction and will move the contact switch 200 to the left (Fig. 14), and when the voltage is lower than that desired, the contact switch will engage the contact point 201, thus closing the circuit including the relay 194. The energization of the relay 194 causes the closing of the switch 196, completing a circuit through the indicating signal 206.

Referring now to Figs. 18 to 21, which show a further modification of the invention, a direct current meter 220 is shown mounted in a casing 221 on a bracket 222 and comprises an external cylindrical magnet 223 of permanent magnet material, such as cobalt steel or other suitable permanent magnetic material, having a pair of pole shoes 224 secured to the inner periphery thereof by screws 225. These pole shoes taper outwardly, as shown at 226, and have a rectangular recess 227 at the base of the tapered portion. A pair of bridges 228 and 229 are adapted to be centered and secured in the recess 227. The lower bridge 229 is integral with a ring 231, which fits in the lower recess 227, while the upper bridge 228 has two ring segments 232 and 233 associated therewith which fit in the upper recess 227 and accomplish the same purpose as the lower ring 231, the purpose of making the upper ring in the two segments 232 and 233 being for convenience in assembling the device. Within the cylindrical space formed by the pole shoes 224 is a fixed permanent magnet 234 of cylindrical shape and made of cobalt steel or other suitable material having a high magnetic remanence and high coercive force. The ends of this magnet are reduced, forming a circumferential groove 235 at either end of the magnet. The inner magnet 234 is provided with pole shoes 236, which extend circumferentially about the inner magnet, a distance co-extensive with the pole shoes 224 secured to the outer magnet. The pole shoes 236 are retained in engagement with the inner magnet by a pair of rings 237 which fit in grooves provided at the ends of the pole shoes. These rings are provided with partially cut-out portions for receiving projections 238 of ring 231 and ring sections 232 and 233. These projections extend through the partially cut-out portions of rings 237, between the side faces of pole shoes 236 and into the groove 235 of the inner magnet to retain the inner magnet securely in position and provide a predetermined annular air gap between the pole shoes 224 and the pole shoes 236. Within this air gap is a movable coil 239 having journal studs 241 secured to opposite ends thereof. These studs carry pivot pins which are journaled in screws 242 mounted in the bridges 228 and 229. Each of the bridges is provided with an integral collar 243, which is adapted to receive a resilient or lock washer 244, upon which an insulating washer 245 of hard rubber or other suitable material is placed. The washer 245 has a collar over which an adjusting lever 246 is placed. A second insulating washer 247 is placed over the lever and the entire assembly is held in place by a locknut 248, which clamps the lever 246 with such compression as to permit its manual adjustment. The levers 246 have one end of spiral springs 251 secured thereto and the other ends of these springs are secured to projections 252 secured to the journal studs 241. The projections 252 are electrically connected to the ends of the coil and conductors 253 are connected to the levers so that the levers serve not only to adjust the zero position of the coil but also as terminals for the electrical circuit to the coil. The upper journal stud 241 also carries a pointer 254, which cooperates with a scale (not shown) to indicate the position of the coil, which is an index of the amount of current flowing through the coil.

Figure 18:
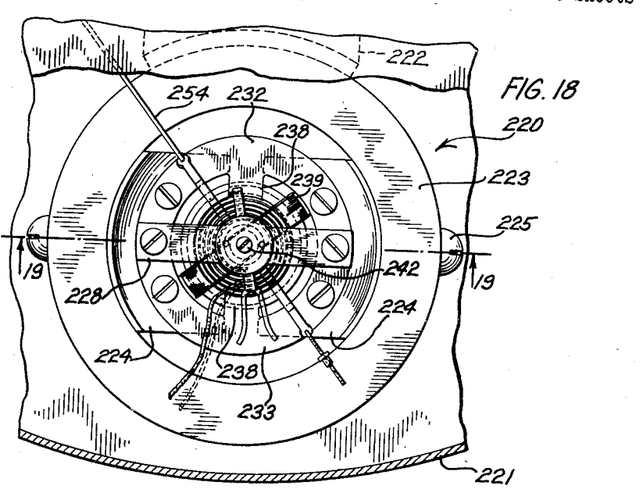
Fig. 18 is a fragmentary plan view of another modification of the device.
Figure 19:
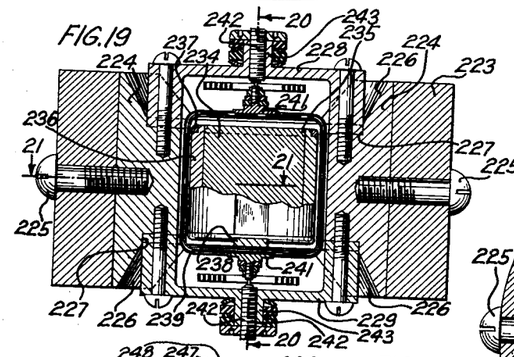
Fig. 19 is a sectional view taken on line 19—19 of Fig. 18.
Figure 20:
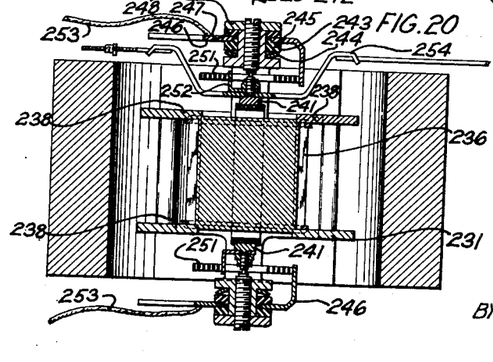
Fig. 20 is a sectional view taken on line 20—20 of Fig. 19.
Figure 21:
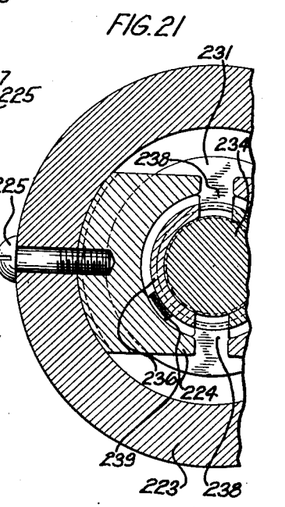
Fig. 21 is a fragmentary section taken on line 21—21 of Fig. 19.

In this embodiment of the invention the outer permanent magnet 223 and the inner permanent magnet 237 are magnetized before the assembly of the device, since the magnets must be magnetized in such a direction that adjacent poles must be of opposite polarity. For instance, the outer magnet 223 will be magnetized so as to have its poles located on a diameter passing through the screws 225. If the pole at the right side of the outer magnet 223, as viewed in Fig. 18, is a north pole, the inner magnet 237 will be magnetized to have its south pole at its right side. Magnetized in this way, the magnetic flux will flow from left to right in two parallel paths in the outer magnet and from right to left in a single path through the inner magnet.

It will be noted that the pole pieces 224, together with the entire inner assembly comprising the inner permanent magnet, the movable coil and the bridges form a single unitary structure, which may be inserted assembled into the outer magnet 223. This makes it possible to insert a keeper of magnetic material in the outer magnet along the axis of the poles to retain the magnetism of the outer magnet after magnetization. The inner assembly may then be inserted in the outer magnet by pushing the keeper out. In this way the device may be assembled with a minimum demagnetization of the outer magnet.

In each of the embodiments of the invention, a source of magnetic potential is provided within the movable coil which insures a minimum of leakage flux and causes a high torque to be exerted on the coil for a given number of ampere turns in the coil. This high torque makes it possible to use comparatively strong springs for the coils which results in a high degree of accuracy of the devices.

It will be understood that the nature and embodiments of the invention herein described and illustrated are merely convenient forms of the invention and that many changes and modifications may be made therein without departing from the spirit and scope of the invention.

What is claimed is:

1. An electromagnetic device comprising means for producing a magnetic potential, a coil rotatable on an axis passing through the coil surrounding said means, and a path of magnetic material externally of said coil.

2. An electromagnetic device comprising means for producing a magnetic potential, a movable coil, a support for positioning said means within the coil, a support for rotatably supporting the coil on an axis passing through the coil, and a path of magnetic material externally of the coil.

3. An electromagnetic device comprising means for producing a magnetic potential, a movable coil surrounding said means, a yoke surrounding the coil, and means for pivotally supporting the coil and centering said means within the coil.

4. An electromagnetic device comprising a cylindrical permanent magnet, a cylindrical yoke of magnetic material surrounding said magnet and spaced therefrom to form an air gap, and a coil movably supported in said air gap.

5. An electromagnetic device comprising a cylindrical permanent magnet, a cylindrical yoke of magnetic material surrounding said magnet and spaced therefrom to form an air gap, a movable coil positioned in the air gap, and means for supporting said magnet concentrically within the yoke.

6. An electromagnetic device comprising a cylindrical permanent magnet, a cylindrical yoke of magnetic material surrounding said magnet and spaced therefrom to form an air gap, a movable coil positioned in the air gap, and means for supporting said magnet concentrically within the yoke, said means having bearings for concentrically supporting the coil in the air gap.

7. An electromagnetic device comprising a cylindrical permanent magnet, a pair of pole pieces of magnetic material secured to the magnet, a cylindrical yoke of magnetic material surrounding the magnet and spaced therefrom to form an air gap, a bridge secured to each end of the yoke and having inwardly extending projections for securing the magnet in position within the yoke, a bearing supported by each of said bridges, and a movable coil pivotally mounted in said bearings.

8. An electromagnetic device comprising a cylindrical yoke having an axially extending peripheral flange at either end, a non-magnetic bridge fitting within each of said flanges, means cooperating with said flanges for positioning the bridges diametrically of the ends of the yoke, a cylindrical magnet within the yoke, said bridges having means for centering the magnet within the yoke, a coil movable between the magnet and the yoke, and bearings carried by said bridges for pivotally mounting and centering the coil.

9. An electromagnetic device comprising a magnet, a yoke of magnetic material surrounding the magnet and forming an air gap therewith, a pair of supports secured to the yoke for positioning the magnet within the yoke, a coil rotatable about said magnet and within the yoke, and a pair of bearings carried by said supports for rotatably mounting said coil.

10. An electromagnetic device comprising a core, a coil wound on the core for producing a magnetic potential therein, a coil rotatable about said core and the coil thereon, and a yoke forming a magnetic path externally of the movable coil.

11. An electromagnetic device comprising a core, a coil wound on the core for producing a magnetic potential therein, a movable coil surrounding said core, a yoke forming a magnetic path externally of the movable coil, and means secured to the yoke for positioning the core and the movable coil within the yoke.

12. An electromagnetic device comprising a cylindrical permanent magnet, a pair of pole pieces therefor of magnetic material, a ring of non-magnetic material for attaching the pole pieces to the magnet, a cylindrical yoke, means secured to the yoke and engaging the magnet, pole pieces, and ring for securing the magnet in position, and a coil movably supported between the pole pieces and the yoke.

13. An electromagnetic device comprising a permanent magnet, a movable coil encompassing said magnet, and a second permanent magnet forming a magnetic circuit with the first permanent magnet and positioned externally of the coil.

14. An electromagnetic device comprising a permanent magnet, a movable coil encompassing the magnet, and a yoke of a nickel-iron alloy forming a magnetic path externally of the coil.

15. An electromagnetic device comprising a permanent magnet, a movable coil encompassing the magnet, and a yoke of magnetic material forming a magnetic path around the coil and shielding the device from external magnetic fields.

16. In a device of the character described, a bar magnet, a yoke surrounding the ends of said bar magnet and spaced therefrom to form a relatively short air gap, a coil rotatably disposed around said bar magnet and in said air gap, and means for urging the rotation of said coil in one direction.

17. In a device of the character described, a bar magnet, a yoke surrounding the ends of said bar magnet and spaced therefrom to form a relatively short air gap, a coil extending around said bar magnet and disposed in said air gap, means for electrically connecting said coil across a circuit supplied with electrical energy, and means for urging said coil out of parallel relation to said bar magnet, the electrical energy supplied to said coil setting up a magnetic flux for opposing said coil moving means for moving the coil in the opposite direction.

18. An electromagnetic device comprising a permanent magnet core, a yoke of magnetic material surrounding said core, a pair of pole pieces of magnetic material secured to said core and forming an air gap with said yoke, and a coil rotatably supported in said air gap.

19. An electromagnetic device comprising a core member of magnetic material, an annular member of magnetic material surrounding the core, a pair of pole pieces extending from one of said members toward the other of said members and forming an air gap therewith, a coil rotatably supported in said air gap, a pointer movable with said coil, and a spring for yieldably holding the coil in a predetermined position.

20. An electromagnetic device comprising a core member of magnetic material, an annular member of magnetic material surrounding the core member, a pair of pole pieces extending from one of said members and forming an air gap with the other member, a coil mounted in said air gap, and means for rotatably supporting said coil.

21. An electromagnetic device comprising a core member of magnetic material, an annular member of magnetic material surrounding the core, diametrically opposite air gaps being provided between said members, a coil having opposite limbs positioned in said air gaps respectively and pivotally mounted for a limited oscillating movement, the axis of rotation of said coil intersecting its physical axis at right angles, and a pointer carried by said coil.

22. An electromagnet device comprising a core of magnetic material, an annular field magnet having poles at diametrically opposite points surrounding the core, pole pieces of soft magnetic material for said magnet positioned at the poles thereof and forming an air gap with the core, and a coil rotatably mounted in said air gap.

23. An electromagnetic device comprising a core of magnetic material, a rotatably mounted coil encompassing the core, a cylindrical magnet having diametrically opposite poles surrounding the core, and a pair of pole pieces having arcuate outer faces engaging the inner periphery of the magnet and forming an air gap with the core for said coil.

24. An electromagnetic device comprising a magnetic core and yoke forming an air gap, a coil mounted in said air gap, a pair of pivots for rotatably supporting the coil, a spiral spring adjacent each of said pivots for yieldably retaining the coil in a predetermined position, and means associated with each of said springs for variably positioning one end of the spring.

25. An electromagnetic device comprising inner and outer magnetic members forming an air gap, a coil rotatably mounted in said air gap, a bridge having bearings for supporting said coil, said outer magnetic member having a flange for receiving the bridge, and an annular member fitting within said flange for positioning the bridge and thereby centering the coil in the air gap.

26. An electromagnetic device comprising inner and outer magnetic members forming an air gap, a coil rotatably mounted in said air gap, a bridge having bearings for supporting said coil, said outer magnetic member having a flange for receiving the bridge, an annular member fitting within said flange for positioning the bridge and thereby centering the coil in the air gap, and a projection extending inwardly from said annular member for positioning the inner magnetic member within the coil.

27. An electromagnetic device comprising a plurality of bar magnets in parallel relation, a yoke of magnetic material surrounding said magnets and forming air gaps at the ends of said magnets, and a coil rotatably mounted so that opposite sides of the coil extend into said air gaps.

28. An electromagnetic device comprising a plurality of bar magnets in parallel relation, an insulating base therefor, a clamp for securing said magnets to the base, a yoke of magnetic material surrounding said magnets and forming air gaps at the ends of said magnets, a pair of standards mounted on said base within the yoke, and a coil rotatably mounted on said standards and movable in said air gaps.

29. An electromagnetic device comprising a plurality of bar magnets in parallel relation, an insulating base therefor, a clamp for securing said magnets to the base, a yoke of magnetic material surrounding said magnets and forming air gaps at the ends of said magnets, said yoke extending over the base and forming a casing for the device, a pair of standards on the base within the yoke, and a coil rotatably mounted on said standards and movable in said air gaps.

30. An electromagnetic device comprising a circular magnet of cobalt steel having poles of opposite polarity at diametrically opposite points, said magnet having a greater axial length than radial thickness, pole pieces having surfaces of similar curvature as the inner surface of said magnet and engaging the magnet, a cylindrical core of magnetic material within said pole pieces and forming a circular air gap therewith, and a magnetically actuated member movable in said air gap.

31. An electromagnetic device comprising a core of magnetic material, an annular field magnet having poles of opposite polarity at diametrically opposite points surrounding the core, pole pieces of soft magnetic material for said magnet positioned at the poles thereof and forming an air gap with the core, and a magnetically actuated member rotatably mounted in said air gap.

32. An electromagnetic device comprising a core, a coil wound on the core for producing a magnetic potential therein, a magnetically actuated member rotatable about said core and the coil thereon, and a yoke forming a magnetic path externally of the magnetically actuated member.

LELAND E. LAWRENCE.